United States Patent
Millar

(10) Patent No.: US 10,952,381 B2
(45) Date of Patent: Mar. 23, 2021

(54) SYSTEMS AND METHODS FOR IMAGE CAPTURE IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 364 days.

(21) Appl. No.: 15/990,094

(22) Filed: May 25, 2018

(65) Prior Publication Data

US 2018/0359931 A1 Dec. 20, 2018

Related U.S. Application Data

(60) Provisional application No. 62/519,304, filed on Jun. 14, 2017, provisional application No. 62/519,413, filed on Jun. 14, 2017.

(51) Int. Cl.
*A01G 7/00* (2006.01)
*A01G 9/20* (2006.01)
(Continued)

(52) U.S. Cl.
CPC ............ *A01G 7/00* (2013.01); *A01C 23/00* (2013.01); *A01G 7/045* (2013.01); *A01G 9/20* (2013.01);
(Continued)

(58) Field of Classification Search
CPC .......... A01G 7/00; A01G 25/16; A01G 22/00; A01G 27/00; A01G 3/04; A01G 7/045;
(Continued)

(56) References Cited

U.S. PATENT DOCUMENTS 4,015,366 A * 4/1977 Hall, III ............... A01D 46/005
47/1.43
4,791,310 A * 12/1988 Honig ................. G01N 21/6408
250/458.1

(Continued)

FOREIGN PATENT DOCUMENTS

CN 105181595 A 12/2015
CN 105557386 A 5/2016
(Continued)

OTHER PUBLICATIONS

International Search Report and Written Opinion of the International Searching Authority, dated Aug. 22, 2018, PCT.

*Primary Examiner* — Christopher D Hutchens
*Assistant Examiner* — Steven J Shur
(74) *Attorney, Agent, or Firm* — Dinsmore & Shohl LLP

(57) ABSTRACT

An image capture system for a grow pod includes a master controller that has a processor, a memory, and cameras that are communicatively coupled to the master controller and positioned to capture images of plants or seeds. The memory stores a grow recipe and a logic. The grow recipe defines instructions for growing the plants or seeds and expected attributes corresponding to the instructions. The logic, when executed by the processor, causes the master controller to perform at least the following: receive, from the cameras, the images of the plants or seeds, determine attributes of the plants or seeds from the images, compare the attributes of the plants or seeds from the images to the expected attributes defined by the grow recipe, and adjust the instructions of the grow recipe for growing the plants or seeds based on the comparison of the attributes to the expected attributes.

18 Claims, 8 Drawing Sheets

(51) Int. Cl.

| | | |
|---|---|---|
| *A01G 9/24* | (2006.01) | |
| *G06T 7/00* | (2017.01) | |
| *G01N 21/84* | (2006.01) | |
| *G06K 9/00* | (2006.01) | |
| *A01C 23/00* | (2006.01) | |
| *A01G 7/04* | (2006.01) | |
| *A01G 27/00* | (2006.01) | |
| *A01G 31/04* | (2006.01) | |
| *H04N 5/225* | (2006.01) | |
| *H04N 5/247* | (2006.01) | |
| *G06T 7/90* | (2017.01) | |
| *H04N 5/238* | (2006.01) | |

(52) U.S. Cl.
CPC ............... *A01G 9/24* (2013.01); *A01G 9/247* (2013.01); *A01G 27/001* (2013.01); *A01G 31/042* (2013.01); *G01N 21/84* (2013.01); *G06K 9/00* (2013.01); *G06T 7/0014* (2013.01); *H04N 5/2256* (2013.01); *H04N 5/247* (2013.01); *G01N 2021/845* (2013.01); *G01N 2021/8416* (2013.01); *G01N 2021/8466* (2013.01); *G06T 7/90* (2017.01); *G06T 2207/10024* (2013.01); *G06T 2207/10152* (2013.01); *G06T 2207/30188* (2013.01); *H04N 5/238* (2013.01)

(58) Field of Classification Search
CPC . A01G 9/20; A01G 9/24; A01G 9/247; A01G 27/001; A01G 31/042; G06T 7/0014; G06T 7/90; G06T 2207/10024; G06T 2207/10152; G06T 2207/30188; G06K 9/00; A01C 23/00; H04N 5/2256; H04N 5/247; H04N 5/238; G01N 2021/8466; G01N 2021/8416; G01N 2021/845
See application file for complete search history.

(56) References Cited

U.S. PATENT DOCUMENTS

| | | |
|---|---|---|
| 5,130,545 A | 7/1992 | Lussier |
| 6,150,158 A | 11/2000 | Bhide et al. |
| 2014/0173769 A1* | 6/2014 | Leyns ...................... A01H 1/04 800/260 |
| 2016/0278300 A1 | 9/2016 | Clendinning et al. |

FOREIGN PATENT DOCUMENTS

| | | |
|---|---|---|
| CN | 106441442 A | 2/2017 |
| CN | 206362383 U | 7/2017 |
| CN | 107318495 A | 11/2017 |
| CN | 206744359 U | 12/2017 |

* cited by examiner

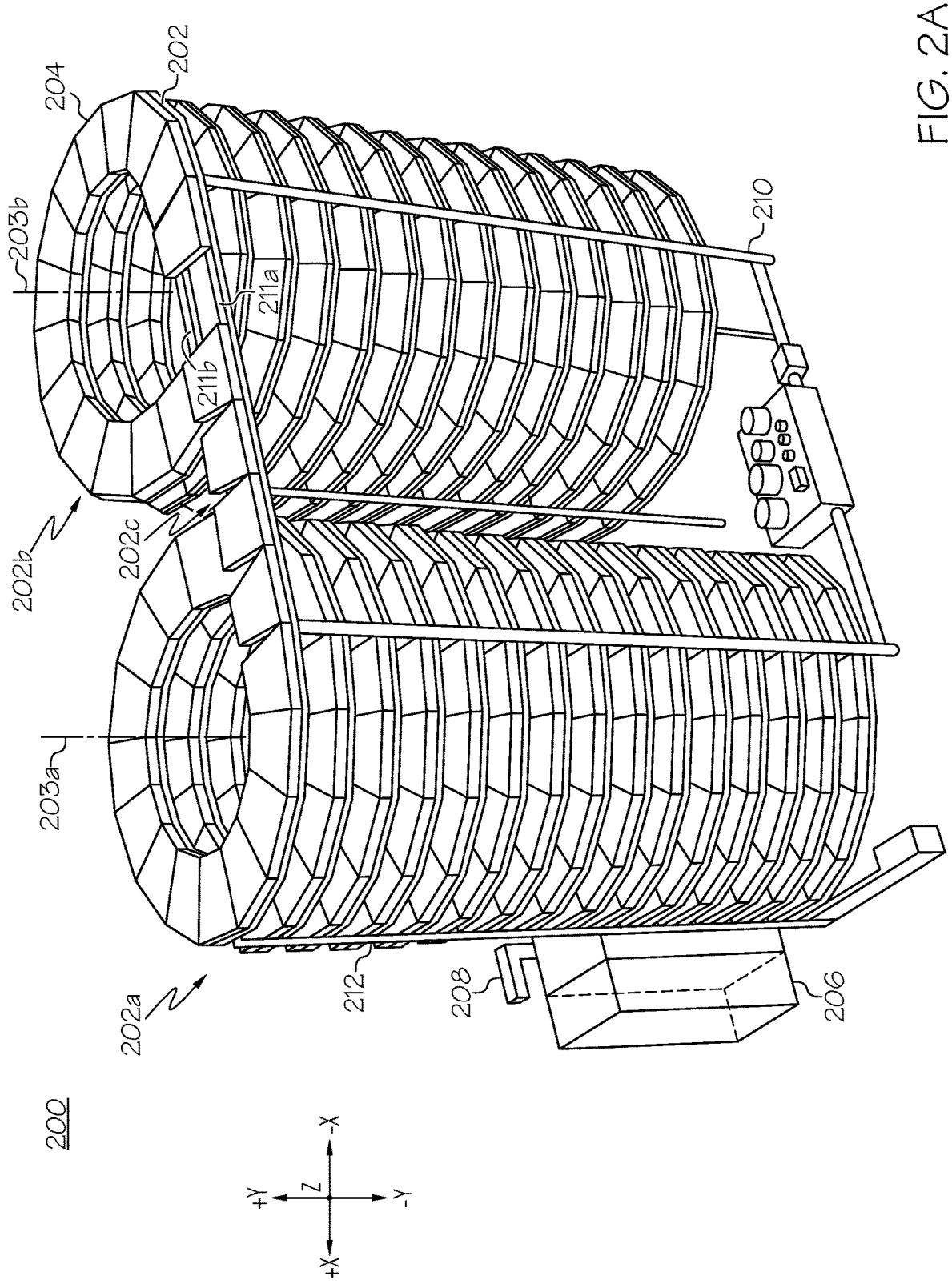

SYSTEMS AND METHODS FOR IMAGE CAPTURE IN AN ASSEMBLY LINE GROW POD

CROSS-REFERENCE TO RELATED APPLICATIONS

This application claims the benefit of U.S. Provisional Application No. 62/519,304, filed Jun. 14, 2017, and the benefit of U.S. Provisional Application No. 62/519,413, filed Jun. 14, 2017, the contents of which are hereby incorporated by reference in their respective entireties.

TECHNICAL FIELD

Embodiments described herein generally relate to systems and methods for providing an assembly line grow pod and, more specifically, to systems and methods for capturing images in an assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Specifically, many farming operations utilize greenhouses to grow crops in a controlled environment. While greenhouses provide some protection from the elements, greenhouses typically do not provide automation or environment control, and therefore typically provide little to no ability to control or improve the growth of a plant or automatically update features of the grow house for growing the plants and seeds based on the images captured.

SUMMARY

In one embodiment, an image capture system for a grow pod includes a master controller that includes a processor, a non-transitory computer readable memory, and one or more cameras communicatively that are coupled to the master controller and positioned to capture one or more images of a plurality of plants, seeds, or both. The non-transitory computer readable memory stores a grow recipe and a logic. The grow recipe defines one or more instructions for growing the plurality of plants, seeds, or both and one or more expected attributes corresponding to the one or more instructions of the grow recipe. The logic, when executed by the processor, causes the master controller to receive, from the one or more cameras, the one or more images of the plurality of plants, seeds, or both, determine one or more attributes of the plurality of plants, seeds, or both from the one or more images, compare the one or more attributes of the plurality of plants, seeds, or both from the one or more images to the one or more expected attributes defined by the grow recipe, and/or adjust the one or more instructions of the grow recipe for growing the plurality of plants, seeds, or both based on the comparison of the one or more attributes to the one or more expected attributes.

In another embodiment, a grow pod having an image capture system includes one or more lighting devices configured to output one or more photon-emitting light wavelengths, a master controller that includes a processor and a non-transitory computer readable memory, one or more cameras communicatively coupled to the master controller and positioned to capture one or more images of a plurality of plants, seeds, or both, and a filter coupled to the one or more cameras and communicatively coupled to the master controller. The non-transitory computer readable memory stores a grow recipe and a logic. The grow recipe defines one or more instructions for growing the plurality of plants, seeds, or both. The logic, when executed by the processor, causes the master controller to determine, from the grow recipe, the one or more photon-emitting light wavelengths output by the one or more lighting devices, and cause an adjustment to the filter to decrease an intensity of the one or more photon-emitting light wavelengths output by the one or more lighting devices.

In another embodiment, a method of utilizing an image capture system in a grow pod includes receiving a grow recipe including one or more instructions for growing a plurality of plants, seeds, or both and one or more expected attributes corresponding to the one or more instructions of the grow recipe and capturing an image from a camera of the plurality of plants, seeds, or both supported in a cart configured to move along a track. The method further includes determining one or more attributes of the plurality of plants, seeds, or both from the image, comparing the one or more attributes of the plurality of plants, seeds, or both from the image to the one or more expected attributes defined by the grow recipe, and adjusting the one or more instructions of the grow recipe for growing the plurality of plants, seeds, or both based on the comparison of the one or more attributes to the one or more expected attributes.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2A schematically depicts a first view of an assembly line grow pod, according to one or more embodiments shown and described herein;

DETAILED DESCRIPTION

Embodiments disclosed herein include systems and methods for providing an image capture system in an assembly line grow pod. Embodiments of the grow pod include an assembly line configuration such that a cart supporting a payload travels on a track of a grow pod to provide sustenance (such as light, water, nutrients, etc.) to seeds and/or plants included in the payload on the cart. The cart may be among one or more other carts arranged on the track of the grow pod to create an assembly line of carts. Some embodiments are configured with an assembly line of plants that follow a track that wraps around a first axis in a vertically upward direction and wraps around a second axis in vertically downward direction. These embodiments may utilize light emitting diode (LED) components for simulating a plurality of different light wavelengths for the plants to grow. The seeds/plants may be monitored throughout the process by use of imaging devices that capture images of the seeds/plants. The systems and methods for providing an assembly line grow pod incorporating the same will be described in more detail below.

Figure 1:
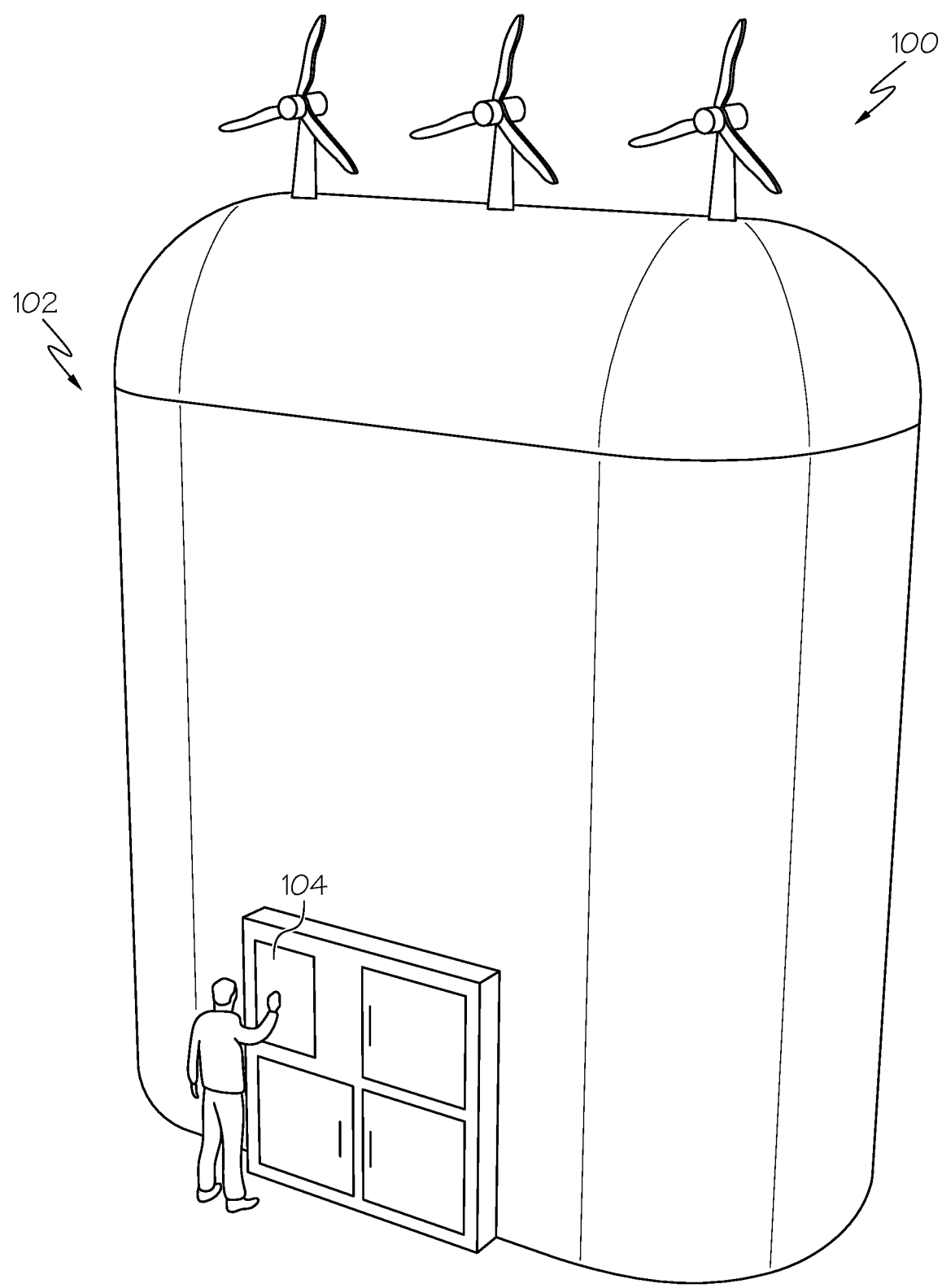
FIG. 1 schematically depicts an enclosure for a grow pod, according to one or more embodiments shown and described herein.

Referring now to the drawings, FIG. 1 depicts a grow pod 100 according to embodiments described herein. As illustrated, the grow pod 100 includes an enclosure 102. The grow pod 100 may be a self-contained unit that maintains an environment inside the enclosure 102 and prevents an external environment for entering the enclosure 102 (or at least affecting the interior portion). As such, the enclosure 102 of the grow pod 100 may provide this function. In some embodiments, coupled to the enclosure 102 is a display 104 (e.g., a control panel) optionally incorporating a user input device 322 (FIG. 4), such as a touch input, keyboard, mouse, or the like. In some embodiments, the display 104 on the exterior of the enclosure 102 of the grow pod 100 may provide a status of the grow pod and or images captured from therein. If a user desires information regarding the status or operation of the assembly line grow pod, components thereof, and/or the growth of the plants therein, the user may use the display 104 to query the master controller for the desired information.

Figure 2B:
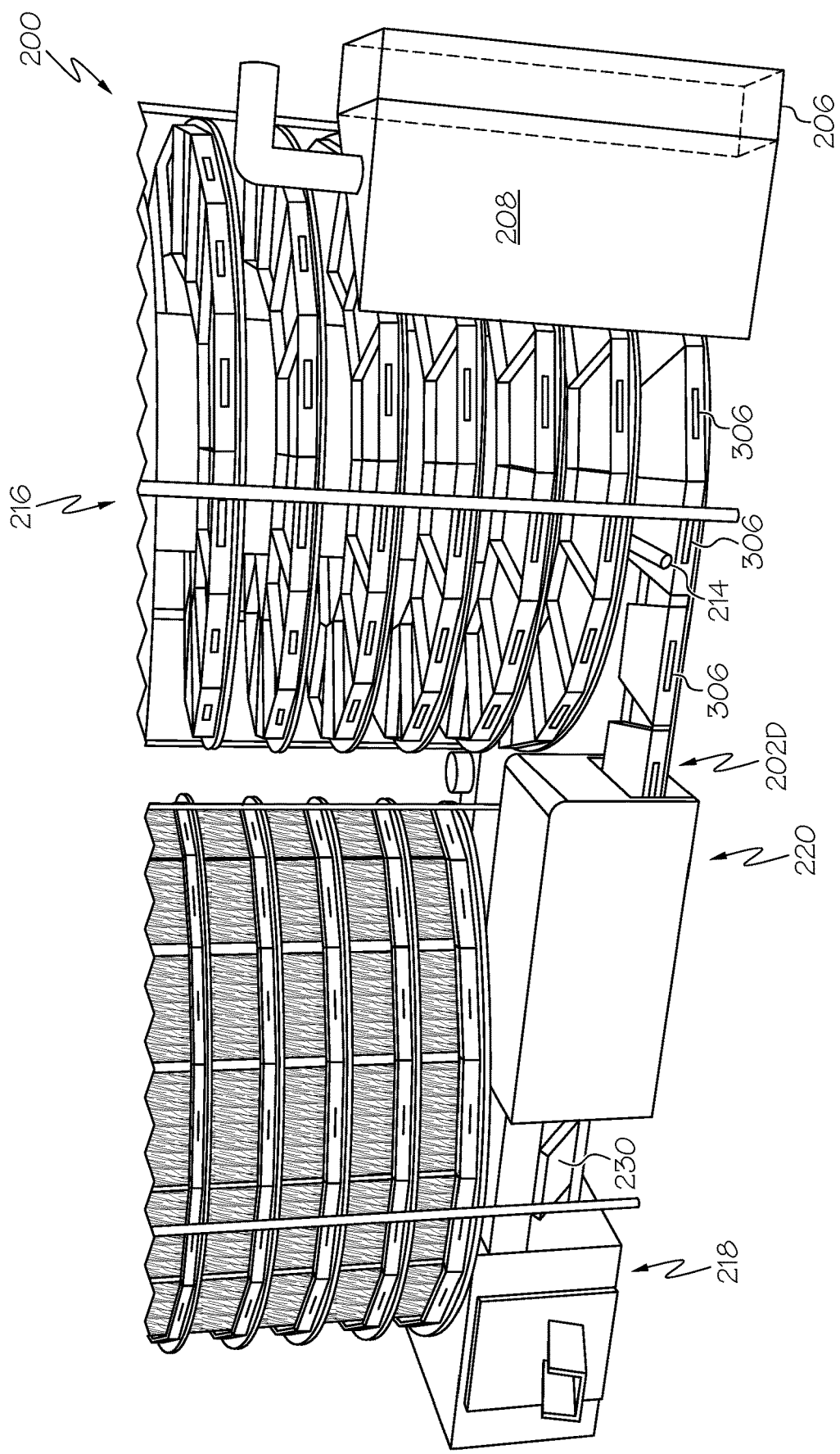
FIG. 2B schematically depicts a second view of the assembly line grow pod, according to one or more embodiments shown and described herein.

Referring now to FIGS. 2A and 2B, an assembly line grow pod 200 is depicted. The assembly line grow pod 200 may reside within the enclosure 102. As illustrated, the assembly line grow pod 200 may include a track 202 that holds one or more carts 204. In some embodiments, the track 202 may include one or more conductive rails 211a and 211b (collectively referred to herein as rails 211) which may support the carts 204 and may electrically couple the carts to a power supply. The track 202 may include an ascending portion 202a, a descending portion 202b, a first connection portion 202c, and a second connection portion 202D (FIG. 2B). The track 202 may wrap around (in a counterclockwise direction in FIGS. 2A and 2B, although clockwise or other configurations are also contemplated) a first axis 203a such that the carts 204 ascend upward in a vertical direction. The first connection portion 202c may be relatively level (although this is not a requirement) and may be utilized to transfer carts 204 to the descending portion 202B. The descending portion 202b may be wrapped around a second axis 203b (again in a counterclockwise direction in FIGS. 2A and 2B) that is substantially parallel to the first axis 203a, such that the carts 204 may be returned closer to ground level.

In some embodiments, a second connection portion 202D (shown in FIG. 2B) may be positioned near ground level that couples the descending portion 202b to the ascending portion 202a such that the carts 204 may be transferred from the descending portion 202b to the ascending portion 202a. Similarly, some embodiments may include more than two connection portions to allow different carts 204 to travel different paths. As an example, some carts 204 may continue traveling up the ascending portion 202a, while some may take one of the connection portions before reaching the top of the assembly line grow pod 200.

Also depicted in FIG. 2A is a master controller 206. The master controller 206 may include an input device, an output device and/or other components. The master controller 206 may be coupled to a nutrient dosing component, a water distribution component, a seeder component 208, and/or other hardware for controlling various components of the assembly line grow pod 200.

The seeder component 208 may be configured to seed one or more carts 204 as the carts 204 pass the seeder in the assembly line. Depending on the particular embodiment, each cart 204 may include a tray 230 (FIG. 2B) for receiving a plurality of seeds. In some embodiments, the tray 230 may be a multiple section tray for receiving individual seeds in each section (or cell) or receiving a plurality of seeds in each cell. The seeder component 208 may detect the presence of the respective cart 204 and may begin laying seed across an area of the cells within the tray 230. The seeds may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

The watering component may be coupled to one or more water lines 210, which distribute water and/or nutrients to one or more trays 230 (FIG. 2B) at predetermined areas of the assembly line grow pod 200. In some embodiments, seeds may be sprayed to reduce buoyancy and then watered. Additionally, water usage and consumption may be monitored, such that at subsequent watering stations, this data may be utilized to determine an amount of water to apply to a seed at that time.

Also depicted in FIG. 2A are airflow lines 212. Specifically, the master controller 206 may include and/or be coupled to one or more components that delivers airflow for temperature control, pressure, carbon dioxide control, oxygen control, nitrogen control, etc. Accordingly, the airflow lines 212 may distribute the airflow at predetermined areas in the assembly line grow pod 200.

Referring now to FIG. 2B, an alternate view of the assembly line grow pod 200 illustrating a plurality of components for an assembly line grow pod 200 is depicted. As illustrated, the seeder component 208 is illustrated, as well as one or more lighting devices 216, a harvester component 218, and a sanitizer component 220.

The assembly line grow pod 200 may include one or more lighting devices 216, such as light emitting diodes (LEDs).

While in some embodiments, LEDs may be utilized for this purpose, this is not a requirement. Any lighting device that produces low heat and provides the desired functionality may be utilized. The one or more lighting devices 216 may be disposed on the track 202 opposite the carts 204, such that the one or more lighting devices 216 direct light waves to the carts 204 on the portion the track 202 directly below. In some embodiments, the one or more lighting devices 216 are configured to create a plurality of different colors and/or wavelengths of light, depending on the application, the type of plant being grown, and/or other factors. Each of the one or more lighting devices 216 may include a unique address such that a master controller 206 may communicate with each of the one or more lighting devices 216. The one or more lighting devices 216 may provide light waves that may facilitate plant growth. Depending on the particular embodiment, the one or more lighting devices 216 may be stationary and/or movable. As an example, some embodiments may alter the position of the one or more lighting devices 216, based on the plant type, stage of development, recipe, and/or other factors.

Additionally, as the plants are lighted, watered, and provided nutrients, the carts 204 may traverse the track 202 of the assembly line grow pod 200. Additionally, the assembly line grow pod 200, for example, utilizing the image capture system, which is described in more detail herein, may detect a growth and/or fruit output of a plant and may determine when harvesting is warranted. If harvesting is warranted prior to the cart 204 reaching the harvester, modifications to a recipe may be made for that particular cart 204 until the cart 204 reaches the harvester. Conversely, if a cart 204 reaches the harvester component 218 and it has been determined that the plants in that cart 204 are not ready for harvesting, the assembly line grow pod 200 may commission that cart 204 for another cycle. This additional cycle may include a different dosing of light, water, nutrients, and/or other treatment and the speed of the cart 204 could change, based on the development of the plants on the cart 204. If it is determined that the plants on a cart 204 are ready for harvesting, the harvester component 218 may facilitate that process.

Still referring to FIG. 2B, the sanitizer component 220 may clean the cart 204 and/or tray 230 and return the tray to the grow position. The tray 230, the cart 204, both, or neither may be overturned for cleaning. In any event, the tray 230 and/or cart 204 are returned to a grow position such that they may traverse the track 202 and receive and grow plants therein. In some embodiments, the image capture system may be utilized to monitor the sanitizing process and detect any issues that may occur.

As illustrated, the sanitizer component 220 may return the tray 230 to the growing position, which is substantially parallel to ground. Additionally, a seeder head 214 may facilitate seeding of the tray 230 as the cart 204 passes. It should be understood that while the seeder head 214 is depicted in FIG. 2B as an arm that spreads a layer of seed across a width of the tray, this is merely an example. Some embodiments may be configured with a seeder head 214 that is capable of placing individual seeds in a desired location.

Figure 3:
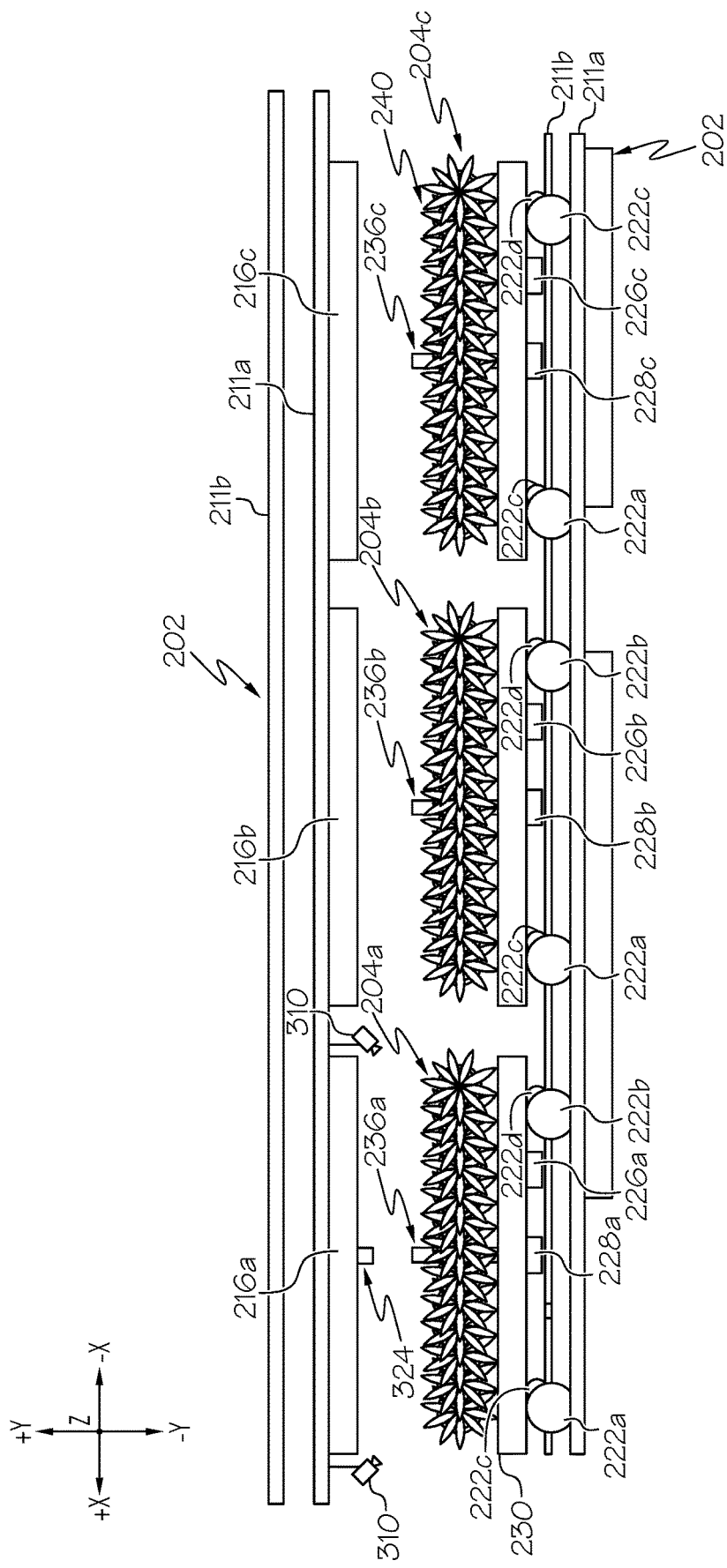
FIG. 3 schematically depicts a plurality of illustrative carts supporting a payload in an assembly line configuration, according to one or more embodiments shown and described herein.

Referring now to FIG. 3, a plurality of illustrative carts 204 (e.g., the first cart 204a, the second cart 204b, and the third cart 204c, collectively carts 204), each supporting a payload 240 in an assembly line configuration on the track 202, is depicted. In some embodiments, the track 202 may include one or more conductive rails 211a and 211b (collectively referred to as rails 211) where at least one wheel 222 (e.g., 222a-222d) of the cart 204 is in electrical contact with the one or more conductive rails 211a and 211b. In such an embodiment, the at least one wheel 222 may relay communication signals and electrical power to the cart 204 as the cart 204 travels along the track 202. In some embodiments, the track 202 includes two conductive rails 211a and 211b as illustrated in FIG. 3. Each of the two conductive rails 211a and 211b (collectively referred to as conductive rails 211) of the track 202 may be electrically conductive. The conductive rails 211 may be configured for transmitting communication signals and electrical power to and from the cart 204 via the one or more wheels 222 rotatably coupled to the cart 204 and supported by the track 202. That is, a portion of the track 202 is electrically conductive and a portion of the one or more wheels 222 is in electrical contact with the portion of the track 202 that is electrically conductive. Although reference herein is made to a track 202 including one or more conductive rails 211, it should be understood that the one or more conductive rails 211 may be any form and type of conductor, which is capable of conducting electrical signals and/or communication signals.

Since the carts 204 are limited to travel along the track 202, the area of track 202 that a cart 204 will travel in the future is referred to herein as "in front of the cart" or "leading." Similarly, the area of track 202 a cart 204 has previously traveled is referred to herein as "behind the cart" or "trailing." Furthermore, as used herein, "above" refers to the area extending from the cart 204 away from the track 202 (i.e., in the +Y direction of the coordinate axes of FIG. 3). "Below" refers to the area extending from the cart 204 toward the track 202 (i.e., in the −Y direction of the coordinate axes of FIG. 3).

Still referring to FIG. 3, the carts 204a-204c may include a tray 230 and/or a payload 240. The tray 230 may support a payload 240 thereon. Depending on the particular embodiment, the payload 240 may contain a plurality of plants, seedlings, seeds, etc. However, this is not a requirement as any payload 240 may be carried on the tray 230 of the cart 204.

As the carts 204 traverse the track 202, the plurality of plants, seedlings, seeds, etc. may receive water, nutrients, air, and light and/or other sustenance from systems configured with the assembly line grow pod 200. Light waves may be provided by one or more lighting devices 216. As an example, a first lighting device 216a, a second lighting device 216b, and a third lighting device 216c may provide lights waves to the plurality of plants, seeds, or seedlings, growing in carts 204a, 204b, and 204c, respectively. The one or more lighting devices 216 (e.g., collectively 216a-216c) are positioned above the carts 204 (e.g., carts 204a-204c) such that light waves may be delivered to the plurality of plants, seedlings, seeds, etc. that are growing therein.

As an illustrative example, the first lighting device 216a positioned above cart 204a provides light to the plurality of plants growing therein. In the event there is an issue with the cart 204a or the plurality of plants growing therein, the lighting device 216a may be utilized to indicate the status of the issue. The lighting device 216a may intermittently flash to draw attention to the area or even change illumination color. However, this is only an example, other manners of controlling or signaling the status of an issue using the one or more lighting devices 216 may be implemented.

It should be understood that each (or at least a portion) of the LEDs that make up the one or more lighting devices 216 or each of the lighting devices (e.g., a first lighting device 216a, a second lighting device 216b, and a third lighting device 216c) may be independently illuminated. Additionally included is a communication path 302, which may take the form of a power cable, an Ethernet cable, and/or other interface for providing power to the one or more lighting devices 216, as well as instructions on the lighting cycle for the one or more lighting devices 216. In some embodiments, the one or more lighting devices 216 may be hardwired for illumination as instructed by the master controller 206.

Other embodiments of the one or more lighting devices 216 may be configured with hardware and/or software for receiving an instruction from the master controller 206 and controlling illumination of the one or more lighting devices 216. Accordingly, the one or more lighting devices 216 may include software and/or other logic that utilizes wave-based technology for reducing heat and other undesirable bi-products of the one or more lighting devices 216. Also depending on the particular embodiment, the LEDs making up the one or more lighting devices 216 may be the same color or at least a portion of the LEDs may be different colors to provide different photon-emitting lighting wavelengths. The photon-emitting lighting wavelengths of the LEDs may be controlled by the processor of the one or more lighting devices 216. As an example, the LEDs may output a photon-emitting lighting wavelength having a red wavelength of light. The red wavelength may be between about 610-720 nanometers. The LEDs may output a photon-emitting lighting wavelength having a blue wavelength. The blue wavelength may be between about 400-470 nanometers. The LEDs may output a photon-emitting lighting wavelengths having a green wavelength. Some embodiments may be configured with each of the LEDs having a different color, and/or with colors beyond the primary colors, such as warm white, cool white, orange, green, violet, black, etc.

Different photon-emitting lighting wavelengths of light have different impact on plants. For example, a blue wavelength of light may increase the growth rate of certain plants. A green wavelength of light may enhance chlorophyll production of certain plants and may be used as a pigment for proper plant viewing. A red wavelength of light, when combined with blue light, may yield more leaves for certain types of plants. A yellow wavelength of light may reduce plant growth for certain types of plants, compared to blue and red light. A violet wavelength of light enhances the color, taste, and aroma of plants.

In embodiments, the master controller 206 stores lighting recipes (e.g., in the grow recipe or plant logic) for various plants and instructs the one or more lighting devices 216 to illuminate based on the lighting recipes. Specifically, the one or more lighting devices 216 illuminate based on a lighting recipe for the plant in the cart 204 passing under that respective lighting device (e.g., 216a, 216b, or 216c). The grow recipe may include a color recipe defining a color of light, an intensity of light, and the number of simulated days of growth associated with the plant.

It should also be understood that by using low heat lighting elements, such as LEDs, the photon-emitting light may be produced with little to no heat. As a consequence, the one or more lighting devices 216 may be positioned at a place relative to a plant that maximizes optimal growth without the risk of burning the plant with heat from the one or more lighting devices 216. Additionally, cooling of a grow room that includes one or more lighting devices 216 may be unnecessary because of the minimal amount of heat produced by the one or more lighting devices 216. Depending on the embodiment, the one or more lighting devices 216 may include as few as one low heat lighting element (e.g., LED) or as many as hundreds of low heat lighting elements to provide the desired illumination. The heat may be reduced by, among other things, locating respective transformers outside of the enclosure 102 (FIG. 1).

Still referring to FIG. 3, one or more cameras 310 may be coupled to the assembly line grow pod 200 as part of the image capture system. The one or more cameras 310 may be coupled to the track 202 and positioned to view a cart 204 and/or the plurality of plants, seeds, or seedlings growing therein. Furthermore, the one or more cameras 310 may be communicatively coupled to the master controller 206 such that images captured by the one or more cameras 310 may be transmitted to the master controller 206 for processing. The one or more cameras 310 may be any device having an array of sensing devices (e.g., pixels) capable of detecting radiation in an ultraviolet wavelength band, a visible light wavelength band, or an infrared wavelength band. The one or more cameras 310 may have any resolution. The one or more cameras 310 may be an omni-directional camera, or a panoramic camera. In some embodiments, one or more optical components, such as a mirror, a filter, fish-eye lens, or any other type of lens may be optically coupled to each of the one or more cameras 310.

Still referring to FIG. 3, the carts 204a-204c may include a drive motor 226a-226c, a cart-computing device 228a-228c, and/or status indicators 306. Collectively, the drive motors 226a-226c, and the cart-computing devices 228a-228c are referred to the drive motor 226, and the cart-computing device 228. The drive motor 226 is coupled to the cart 204. In some embodiments, the drive motor 226 may be coupled to at least one of the one or more wheels 222 such that the cart 204 is capable of being propelled along the track 202 in response to a received signal. In other embodiments, the drive motor 226 may be coupled to the track 202. For example, the drive motor 226 may be rotatably coupled to the track 202 through one or more gears, which engage a plurality of teeth, arranged along the track 202 such that the cart 204 is propelled along the track 202. That is, the gears and the track 202 may act as a rack and pinion system that is driven by the drive motor 226 to propel the cart 204 along the track 202.

The drive motor 226 may be configured as an electric motor and/or any device capable of propelling the cart 204 along the track 202. For example, the drive motor 226 may be a stepper motor, an alternating current (AC) or direct current (DC) brushless motor, a DC brushed motor, or the like. In some embodiments, the drive motor 226 may comprise electronic circuitry, which may be used to adjust the operation of the drive motor 226, in response to a communication signal (e.g., a command or control signal for controlling the operation of the cart 204) transmitted to and received by the drive motor 226. The drive motor 226 may be coupled to the tray 230 of the cart 204 or may be directly coupled to the cart 204. In some embodiments, more than one drive motor 226 may be included on the cart 204. For example, the wheels 222 may be rotatably coupled to a drive motor 226 such that the drive motor 226 drives rotational movement of the wheels 222. In other embodiments, the drive motor 226 may be coupled through gears and/or belts to an axle, which is rotatably coupled to one or more wheels 222 such that the drive motor 226 drives rotational movement of the axle that rotates the one or more wheels 222.

In some embodiments, the drive motor 226 is electrically coupled to the cart-computing device 228. The cart-computing device 228 may electrically monitor and control the speed, direction, torque, shaft rotation angle, or the like, either directly and/or via a sensor that monitors operation of the drive motor 226. In some embodiments, the cart-computing device 228 may electrically control the operation of the drive motor 226. The cart-computing device 228 may receive a communication signal transmitted through the electrically conductive track 202 and the one or more wheels 222 from the master controller 206 or other computing device communicatively coupled to the track 202. The cart-computing device 228 may directly control the drive motor 226. In some embodiments, the cart-computing device 228 executes a power logic to control the operation of the drive motor 226.

Still referring to FIG. 3, the cart-computing device 228 may control the drive motor 226 in response to one or more signals received from a sensor module 236 included on the cart 204 in some embodiments. The sensor module 236 may include an infrared sensor, a photo-eye sensor, a light sensor (e.g., light sensor 324, FIG. 4), an ultrasonic sensor, a pressure sensor, a proximity sensor, a motion detector, a contact sensor, an image sensor, an inductive sensor (e.g., a magnetometer) or other type of sensor capable of detecting at least the presence of an object (e.g., another cart 204 or a track sensor module) and generating one or more signals indicative of the detected event (e.g., the presence of the object). In some embodiments, the sensor module 236 may include a moisture sensor, a water level sensor, a pH sensor, a nutrient sensor, a temperature sensor, a light sensor, a contaminant sensor, a plant growth sensor, a color sensor, a camera, or the like.

The sensor module 236 may generate one or more signals corresponding to a status, which corresponds to the status of the cart 204 (including a component of the cart 204) and/or the plurality of plants therein. For example, the status of the cart 204 may include operating information including the speed, direction, torque, or etc. of the cart 204. The status of the cart 204 may also include information about the cart 204, for example, whether the drive motor 226 is operating within specified parameters, whether the cart 204 is receiving sufficient power from the track 202, whether one or more wheels 222 of the cart 204 is derailed, a malfunction with the cart 204, or other related information. The one or more signals generated by the sensor module 236 may be transmitted to the cart-computing device 228 and/or the master controller 206.

Figure 4:
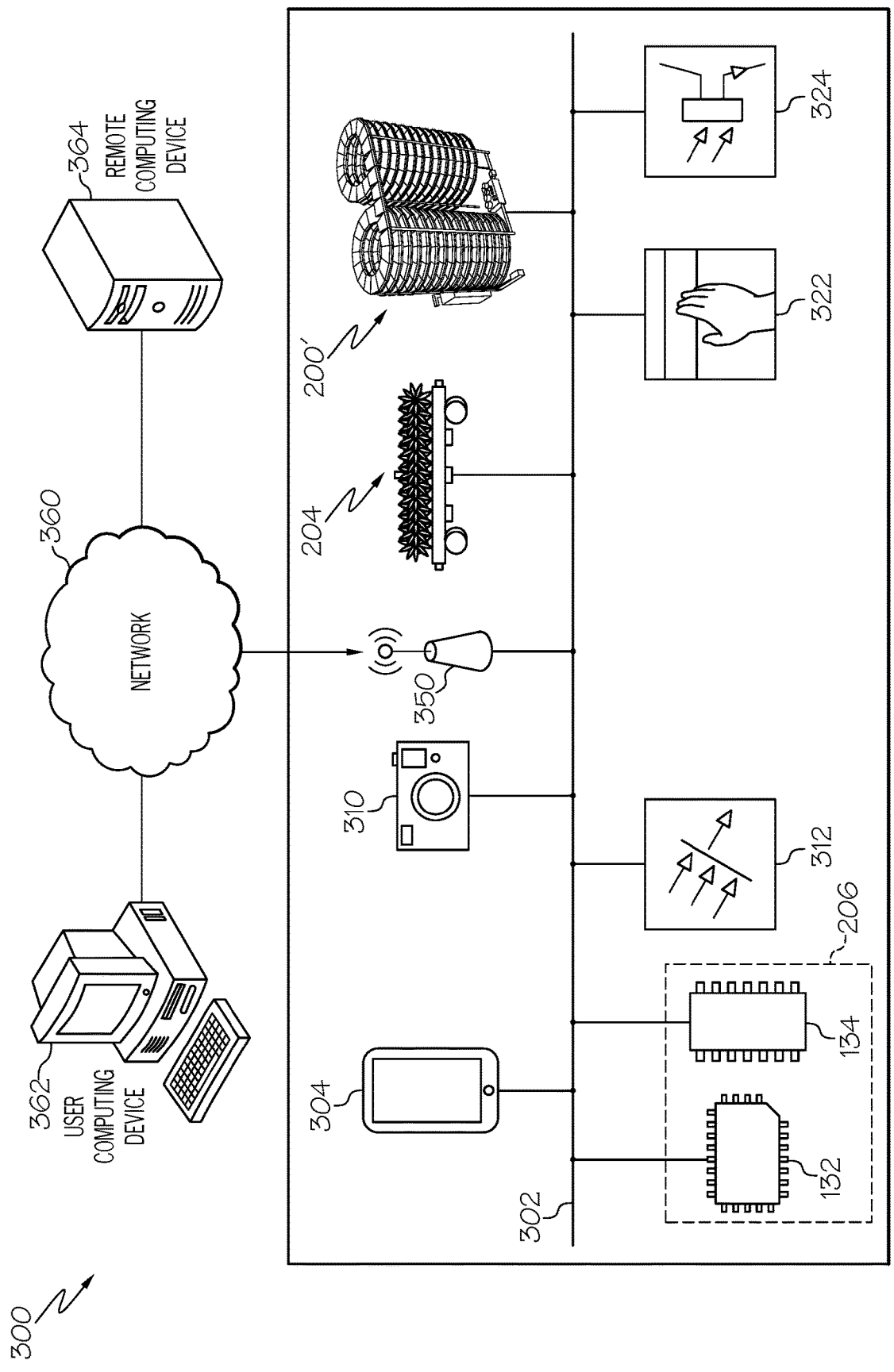
FIG. 4 schematically depicts an image capture system for an assembly line grow pod, according to one or more embodiments shown and described herein.

In some embodiments, the sensor module 236 may be communicatively coupled to the master controller 206. The sensor module 236 may generate one or more signals that may be transmitted via the one or more wheels 222 and the track 202. The track 202 and/or the cart 204 may be communicatively coupled to a network 360 (FIG. 4). Therefore, the one or more signals may be transmitted to the master controller 206 via the network 360 over a network interface hardware (e.g., a communication module or the like) or the track 202. In response, the master controller 206 may generate a notification of the status corresponding to the one or more signals of the sensor module 236.

Referring now to FIG. 4, an image capture system 300 in an assembly line grow pod 200 is depicted. The image capture system 300 utilizes one or more cameras 310 to capture images of the assembly line grow pod 200, a component thereof, and/or the plurality of plants, seeds, or seedlings growing therein. In some embodiments, the image capture system 300 may be communicatively coupled to a network 360 and a user computing device 362, and/or a remote computing device 364. The image capture system 300 may include a plurality of components including the master controller 206 having a processor 132 and non-transitory computer readable memory 134 communicatively coupled to a display 304, one or more cameras 310, one or more filters 312 for the one or more cameras 310, an input device 322, a light sensor 324, the one or more carts 204, and other components of the assembly line grow pod 200'. The plurality of components of the image capture system 300 may be physically coupled and/or may be communicatively coupled through a communication path 302 and/or a network 360, for example utilizing a communication module 350. As described in more detail herein, the communication module 350 may be any device capable of transmitting and/or receiving data from a network 360. The various components of the image capture system 300 and the interaction thereof will be described in detail herein.

The communication path 302 may be formed from any medium that is capable of transmitting a signal such as, for example, conductive wires, conductive traces, optical waveguides, or the like. The communication path 302 may also refer to the expanse in which electromagnetic radiation and their corresponding electromagnetic waves traverse. Moreover, the communication path 302 may be formed from a combination of mediums capable of transmitting signals. In one embodiment, the communication path 302 comprises a combination of conductive traces, conductive wires, connectors, and/or buses that cooperate to permit the transmission of electrical data signals to components such as processors, memories, sensors, input devices, output devices, and communication devices. Accordingly, the communication path 302 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 302 communicatively couples the various components of the image capture system 300. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 4, the master controller 206 may be any device or combination of components comprising a processor 132 and a non-transitory computer-readable memory 134. The processor 132 of the image capture system 300 may be any device capable of executing the machine-readable instruction set stored in the non-transitory computer-readable memory 134. Accordingly, the processor 132 may be an electric controller, an integrated circuit, a microchip, a computer, or any other computing device. The processor 132 may be communicatively coupled to the other components of the image capture system 300 by the communication path 302. Accordingly, the communication path 302 may communicatively couple any number of processors with one another, and allow the components coupled to the communication path 302 to operate in a distributed computing environment. Specifically, each of the components may operate as a node that may send and/or receive data. While the embodiment depicted in FIG. 4 includes a single processor 132, other embodiments may include more than one processor 132.

The non-transitory computer-readable memory 134 of the image capture system 300 is coupled to the communication path 302 and communicatively coupled to the processor 132. The non-transitory computer-readable memory 134 may comprise RAM, ROM, flash memories, hard drives, or any non-transitory memory device capable of storing a machine-readable instruction set such that the machine-readable instruction set can be accessed and executed by the processor 132. The machine-readable instruction set (e.g., first logic) may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer-readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 4 includes a single non-transitory computer-readable memory 134, other embodiments may include more than one memory module.

Still referring to FIG. 4, the image capture system 300 may include a display 304 for providing a visual output; for example, a visualization of the images captured by the one or more cameras 310 or an interface with the master controller 206. The display 304 is coupled to the communication path 302. Accordingly, the communication path 302 communicatively couples the display 304 with other modules of the image capture system 300. The display 304 may include any medium capable of transmitting an optical output such as, for example, a cathode ray tube, light emitting diodes, a liquid crystal display, a plasma display, or the like. Moreover, the display 304 may be a touchscreen that, in addition to providing optical information, detects the presence and location of a tactile input upon a surface of or adjacent to the display 304. Accordingly, each display 304 may receive mechanical input directly upon the optical output provided by the display 304. Additionally, the display 304 may be the display 304 of a portable personal device such as a smart phone, tablet, laptop or other electronic device. Additionally, it is noted that the display 304 can include one or more processors and one or more non-transitory computer-readable memories. While the image capture system 300 includes a display 304 in the embodiment depicted in FIG. 4, the image capture system 300 may not include a display 304 or may include many displays 304.

In some embodiments, an input device 322 is a separate device from the display 304. The input device 322 may be coupled to the communication path 302 and communicatively coupled to the processor 132. The input device 322 may be any device capable of transforming user contact into a data signal that can be transmitted over the communication path 302 such as, for example, a keyboard, a mouse, a button, a lever, a switch, a knob, a touch sensitive interface, a microphone or the like. In some embodiments, the input device 322 is integrated with the display 304, which provides a user the capability of querying the image capture system 300 for images of the operation and/or status of the assembly line grow pod, components thereof, and/or the plants growing therein. It should be understood that some embodiments may not include the input device 322 or may include more than one input device 322.

Still referring to FIG. 4, the image capture system 300 may further include one or more cameras 310. The one or more cameras 310 may be communicatively coupled to the communication path 302 and to the master controller 206. As described above, the one or more cameras are positioned to capture at least images of the cart 204 and/or the plurality of plants, seeds, and seedlings growing therein. In some embodiments, the one or more cameras 310 may be positioned to capture components of the assembly line grow pod 200. For example, the one or more cameras 310 may be positioned to capture images of the seeder component 208, the harvester component 218, the sanitizer component 220 and/or portions of track 202.

In operation, the one or more cameras 310 capture images of components of the assembly line grow pod 200, components thereof, and or the plurality of plants, seeds, or seedlings growing therein and transmit the image to the master controller 206 and/or the cart-computing device 228. The images may be received and processed by the master controller 206 and/or the cart-computing device 228 using one or more image processing algorithms. Any known or yet-to-be developed video and image processing algorithms may be applied to the image data in order to identify objects, determine a location of an object relative to other objects in an environment and/or detect motion of the objects. Example video and image processing algorithms include, but are not limited to, kernel-based tracking (mean-shift tracking) and contour processing algorithms. In general, video and image processing algorithms may detect objects and movement from sequential or individual frames of image data. One or more object recognition algorithms may be applied to the image data to estimate the three-dimensional structure of objects to determine their relative locations to each other. For example, structure from motion, which is a photogrammetric range imaging technique for estimating three-dimensional structures from image sequences, may be used. Object recognition algorithms may include, but are not limited to, scale-invariant feature transform ("SIFT"), speeded up robust features ("SURF"), and edge-detection algorithms. It should be understood that these are only examples of object detection, segmentation, and image analysis algorithms. Any known or yet-to-be-developed object recognition, detection, segmentation, and/or image analysis algorithms may be used to extract and label objects, edges, dots, bright spots, dark spots or even optical characters and/or image fragments within the image data.

The image capture system 300 may include one or more filters 312. The one or more filters 312 may be coupled to the one or more cameras 310 and/or placed in the field of view of the one or more cameras 310. The filters 312 may operate to reduce an intensity of one or more wavelengths of light. In some embodiments, the one or more filters 312 are communicatively coupled to the master controller 206, such that the master controller may control the one or more wavelengths the one or more filters 312 are configured to block or reduce the intensity thereof. The one or more filters 312 may include any device capable of allowing particular wavelengths of light to pass through the filter material while blocking or reducing the intensity of other wavelengths. The one or more filters 312 may be an absorptive filter that absorbs particular wavelengths of light, a dichroic filter that reflects particular wavelengths of light, a monochromatic filter that only allows a particular wavelength of light to pass, a polarizer, and/or the like. Other filters or devices that allow the one or more cameras 310 to capture an image without interference from the light emitted by the one or more lighting devices 216 are contemplated and included within the scope of the present disclosure.

For example, the one or more filters 312 may comprise an electrochromic material. The electrochromic material may be a film, a glass, and/or a coating. The electrochromic material may include one or more color-switchable electrochemical cells. In operation, the master controller 206 may generate one or more control signals for selectively switching the color of the electrochemical cells or selecting cells of a particular color to provide a filter that is capable of filtering one or more wavelengths of light. However, electrochromic material is only one example of a material that the one or more filters may comprise. Other examples may include transparent displays or physically colored materials that may be configured in one or more color wheels such that when one or more of the colored materials are aligned, one or more wavelengths of light may be filtered.

In some embodiments, one or more filters may filter visible lights, ultraviolet light, infrared light and/or other spectrums of electromagnetic waves such that the light received by the one or more cameras capturing an image may be tuned to capture a desired color and structural features without interference from light present in the environment. For example, if the one or more lighting devices output a blue wavelength of light the image captured by the camera may be saturated with blue wavelengths of light. However, by causing a filter to reduce the intensity of the blue wavelengths of light received by the camera, the image captured may not be saturated with blue wavelength colors. Using a filter to color correct an image may be necessary, for example, when the master controller 206 is analyzing images of the plurality of plants to determine one or more attributes of the plants, for example color. The color of a plant may indicate that the plant is or is not receiving the right type and amounts of nutrients.

In some embodiments, the one or more sensors may include a light sensor 324 that is coupled to the communication path 302 and communicatively coupled to the master controller 206. The light sensor 324, for example, may be coupled to one or more lighting devices 216, the track 202 and/or other structures of the assembly line grow pod 200. The light sensor 324 may be any sensor capable of generating one or more signals indicative of the presence of light. In some embodiments, the light sensor 324 is a device that generates one or more signals corresponding to light intensity, wavelength, and/or frequency. For example, a light sensor 324 may include an optical detector, a light dependent resistor, a photodiode, a phototube and the like to generate the one or more signals corresponding to the detection of light.

It should be understood that the image capture system may further be communicatively coupled to the one or more carts 204 of the assembly line grow pod 200 and utilize the one or more components and systems of the one or more carts 204. In some embodiments, the image capture system 300 may be integrated within one or more carts 204 to provide the status of the one or more carts 204. Additionally, the image capture system 300 may be communicatively coupled to the components of the assembly line grow pod 200', for example, the seeder component 208, the one or more lighting devices 216, the harvester component 218, and/or the sanitizer component 220. Each of these components may be monitored by the one or more sensors and/or the master controller 206 to assure they are operating within predefined operating parameters.

Still referring to FIG. 4, the image capture system 300 may include a communication module 350 that couples to the communication path 302 and communicatively couples to the master controller 206. The communication module 350 may be any device capable of transmitting and/or receiving data via a network 360. Accordingly, the communication module 350 can include a communication transceiver for sending and/or receiving any wired or wireless communication. For example, the communication module 350 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the communication module 350 includes hardware configured to operate in accordance with the Bluetooth wireless communication protocol. In another embodiment, communication module 350 may include a Bluetooth send/receive module for sending and receiving Bluetooth communications to/from a network 360.

In some embodiments, the image capture system 300 may be communicatively coupled to a user computing device 362 (e.g., a local device) and/or a remote computing device 364 via the network 360. In some embodiments, the network 360 is a personal area network that utilizes Bluetooth technology to communicatively couple the image capture system 300 to the user computing device 362 and/or a remote computing device 364. In other embodiments, the network 360 may include one or more computer networks (e.g., a personal area network, a local area network, or a wide area network), cellular networks, satellite networks and/or a global positioning system and combinations thereof. Accordingly, the image capture system 300 can be communicatively coupled to the network 360 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 4, as stated above, the network 360 may be utilized to communicatively couple the image capture system 300 with a user computing device 362 (e.g., a local device) and/or a remote computing device 364. In some embodiments, the network 360 may communicatively couple the image capture system 300 to the internet. That is, the image capture system 300 may connect with the remote computing device 364, which includes but is not limited to laptop computers, smart phones, tablet computers, servers, or other networks anywhere in the world.

It should now be understood that the image capture system 300 may include a variety of components for capturing images of the assembly line grow pod 200, components thereof, and/or the plurality of plants, seeds, and/or seedlings growing therein.

Figure 5:
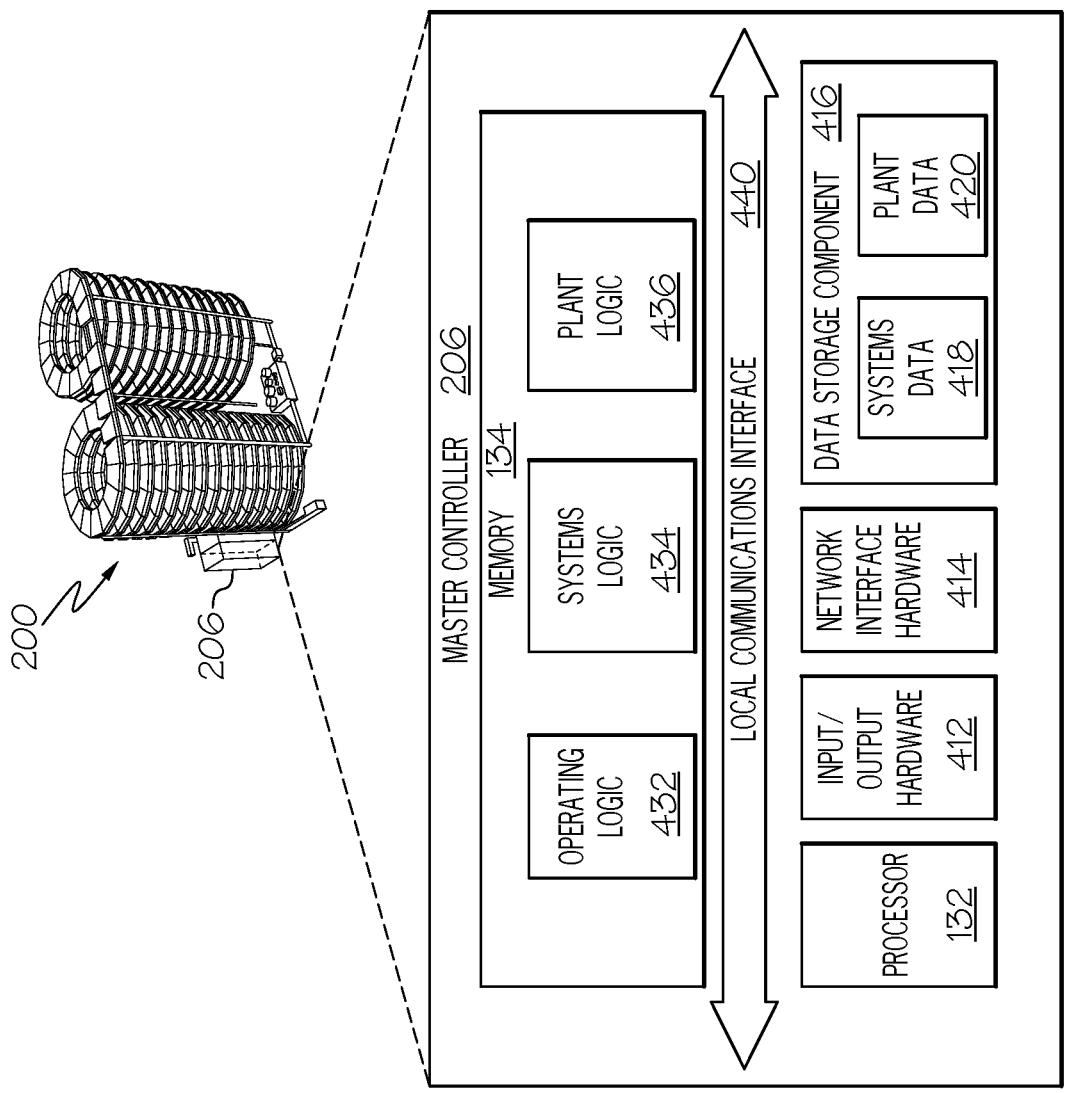
FIG. 5 schematically depicts various components of an illustrative master controller for controlling an assembly line grow pod, according to one or more embodiments shown and described herein.

Referring now to FIG. 5, a schematic of the master controller 206 according to one or more embodiment is depicted. In some embodiments, the image capture system 300 may be implemented with the master controller 206 of the assembly line grow pod 200. As illustrated, the master controller 206 includes a processor 132, input/output hardware 412, a network interface hardware 414, a data storage component 416 (which stores systems data 418, plant data 420, and/or other data), and a non-transitory computer readable memory (i.e., the memory component 134). The memory component 134 may store one or more logics including, for example, the operating logic 432, the systems logic 434, and the plant logic 436. As described in more detail below, the systems logic 434 may monitor and control operations of one or more of the components of the assembly line grow pod 200. For example, the systems logic 434 may monitor and control operations of the light devices, the water distribution component, the nutrient distribution component, the air distribution component. The plant logic 436 may be configured to define, determine, and/or receive a grow recipe for plant growth and may facilitate implementation of the recipe via the systems logic 434.

Embodiments of a grow recipe may include one or more instructions that dictate the timing, intensity, and wavelength of light, pressure, temperature, watering, nutrients, molecular atmosphere, and/or other variables that optimize plant growth and output. The grow recipe may be implemented strictly and/or modified based on results of a particular plant, tray, or crop. The grow recipes may also include one or more expected attributes corresponding to the one or more instructions. For example, the one or more expected attributes may define a size of the plant, the health of the plant, a stage of the plant (e.g., a seed stage, a seedling stage, a mature plant stage, a germination stage, etc.), a presence of fruits, a color of the plant, a presence (or lack thereof) of parasites and/or other foreign organisms, and/or the like. The one or more expected attributes may be defined as the result of carrying out one or more instructions of the grow recipe. For example, a grow recipe may include the following instructions and expected attributes as show in Table 1 below.

TABLE 1

Example Grow Recipe

| Step | Time | Instruction 1 | Instruction 2 | Expected Attributes Upon Completion of Step |
|---|---|---|---|---|
| 1 | 3 days | Active lighting device, Intensity 80%, Photon-emitting lighting wavelength 400-470 nm | Water, Twice a day, 50 mL | Germination stage Size: 2-5 cm height |
| 2 | 2 days | Active lighting device, Intensity 80%, Photon-emitting lighting wavelength 610-720 nm | Water with nutrient mix, Twice a day, 100 mL | Seedling stage Size: 10-18 cm height Color: Light green |
| 3 | 2 days | Active lighting device, Intensity 65%, Photon-emitting lighting wavelength 400-470 nm | Water, Three times a day, 100 mL | Mature stage Size: 18-24 cm height Color: Dark green |

The memory component 134 may store operating logic 432, the systems logic 434, and the plant logic 436. The systems logic 434 and the plant logic 436 may each include a plurality of different pieces of logic, each of which may be embodied as a computer program, firmware, and/or hardware, as an example. A local communications interface 440 is also included in FIG. 5 and may be implemented as a bus or other communication interface to facilitate communication among the components of the master controller 206.

The processor 132 may include any processing component operable to receive and execute instructions (such as from a data storage component 416 and/or the memory component 134). The input/output hardware 412 may include and/or be configured to interface with microphones, speakers, a display, and/or other hardware.

The network interface hardware 414 may interface with the communication module 350 (FIG. 4). The network interface hardware 414 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the master controller 206 and other computing devices, such as the user computing device 362 (FIG. 4) and/or remote computing device 364 (FIG. 4).

The operating logic 432 may include an operating system and/or other software for managing components of the master controller 206. As also discussed above, systems logic 434 and the plant logic 436 may reside in the memory component 134 and may be configured to perform the functionality, as described herein.

It should be understood that while the components in FIG. 5 are illustrated as residing within the master controller 206, this is merely an example. In some embodiments, one or more of the components may reside external to the master controller 206. It should also be understood that, while the master controller 206 is illustrated as a single device, this is also merely an example. In some embodiments, the systems logic 434 and the plant logic 436 may reside on different computing devices. As an example, one or more of the functionalities and/or components described herein may be provided by the user computing device 362 (FIG. 4) and/or remote computing device 364 (FIG. 4).

Additionally, while the master controller 206 is illustrated with the systems logic 434 and the plant logic 436 as separate logical components, this is also an example. In some embodiments, a single piece of logic (and/or or several linked modules) may cause the master controller 206 to provide the described functionality.

Figure 6:
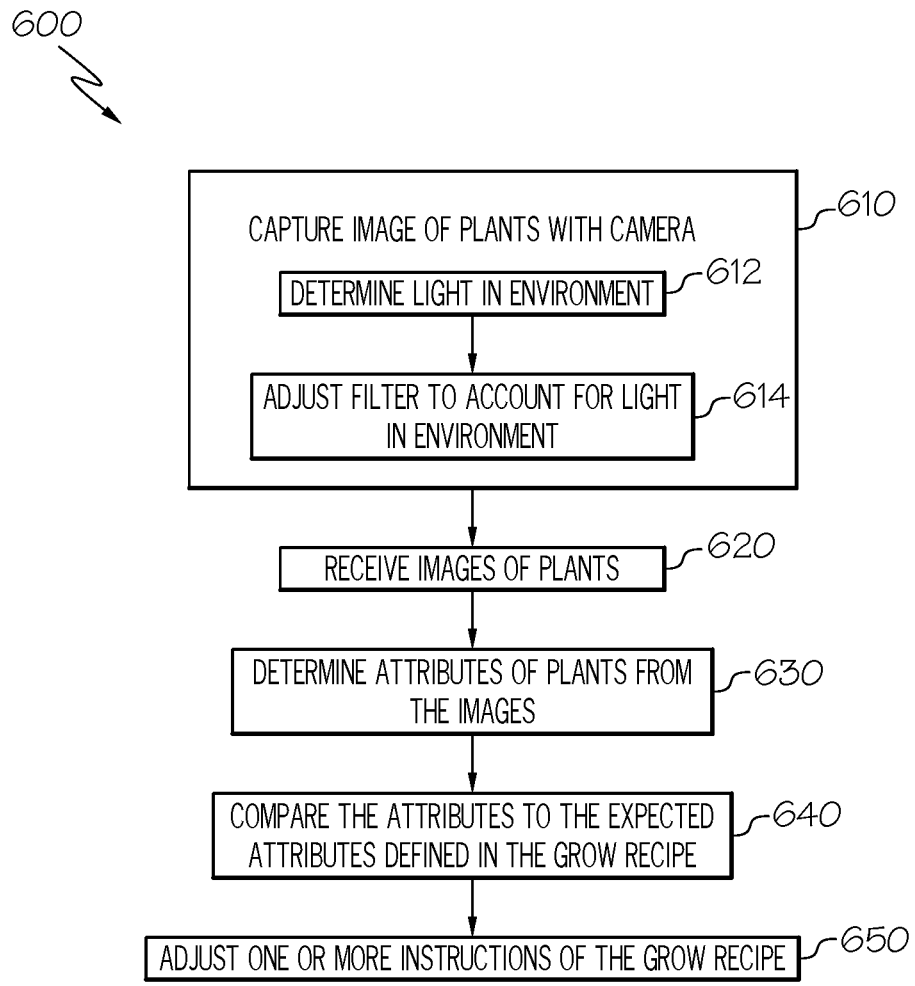
FIG. 6 depicts a flowchart of a method of capturing images using an image capture system in an assembly line grow pod, according to one or more embodiments shown and described herein.

Referring now to FIG. 6, a flowchart 600 for a method of capturing images using an image capture system in an assembly line grow pod according to one or more embodiments shown and described herein. In some embodiments, the logic of the master controller may be configured with the logic depicted in the flowchart 600. At block 610, the master controller may cause the camera to capture images of the plurality of plants, seeds, or seedlings growing in the grow pod. In some embodiments, capturing an image includes determining the light present in the environment at block 612. For example, the master controller may determine from the one or more instructions of the grow recipe the one or more photon-emitting light wavelengths output by the one or more lighting devices. The one or more instructions may define the intensity, wavelength, or the like for the one or more lighting devices. That is, the master controller may look up the one or more instructions relating to the one or more lighting devices in the plant logic and/or plant data to determine the intensity, wavelength, or the like for the one or more lighting devices. By way of another example, the image capture system may include a light sensor communicatively coupled to the master controller. The master controller may receive one or more signals from the light sensor corresponding to the intensity, wavelength, or the like of the light output by the one or more lighting devices for growing.

In response to the determination of the light in the environment at block 612, the master controller, at block 614, may cause a filter to adjust to account for the one or more photon-emitting light wavelengths output by the one or more lighting devices. For example, the filter may be adjusted to decrease the intensity of or block the one or more photon-emitting light wavelengths output by the one or more lighting devices. In operation, this may provide the camera with the capability of capturing one or more images that are not biased by the color, intensity, or wavelength of light output by the one or more lighting devices. In operation, the master controller may adjust the filter in near-real time or real time by determining the output parameters of the one or more lighting devices from the grow recipe or from the one or more signals from the light sensor.

In some embodiments, the master controller may deactivate the one or more light devices while the camera captures images. Alternatively, the master controller may generate one or more control signals that cause the one or more lighting devices to stop outputting the one or more photon-emitting light wavelengths and instead output light including wavelengths of light across the visible spectrum. Then, once the images have been captured, the master controller may adjust the output of the lighting device back to outputting the one or more photon-emitting light wavelengths for growing.

At block 620, the master controller may receive the one or more images from the one or more cameras. The one or more images may include images of the plurality of plants, seeds, seedlings, or the like. Additionally, the images may include images of the cart or other components of the assembly line grow pod. At block 630, the master controller may determine one or more attributes of the plurality of plants, seeds, or seedlings from the one or more images. The one or more attributes may include a determination that the plurality of plants, seeds, or seedlings, have reached a growth stage (e.g., a seeding stage, a germination stage, a seedling stage, a mature stage, etc.), contain fruits, have a particular a color, contain (or lack) parasites and/or other foreign organisms, and/or the like. These are only a few examples of the one or more attributes, which may be determined from the images. It should be understood that other attributes exist and may be determined.

The one or more attributes may be compared to one or more expected attributes of the plurality of plants, seeds, or seedlings as defined in the grow recipe or plant logic, at block 640. For example, if the one attribute is determined to be a color of the plant, then the color of the plant may be compared to the expected color based on the one or more expected attributes defined in grow recipe for the plant. By including one or more expected attributes in the grow recipe and/or plant logic, the master controller may determine whether the plants, seeds, or seedlings are growing predicted. In the event the plurality of plants, seeds, or seedlings are exceeding expectations or do not meet expectations, the master controller may adjust one or more instructions of the grow recipe for growing the plurality of plants, seeds, or seedlings. For example, when the plurality of plants, seeds, or seedlings fail to meet expectations, the master controller may increase the dosage of light, change the photon-emitting lighting wavelength, a duration of light, an amount of nutrients, an amount or frequency of water or other growing parameters. However, when the plurality of plants, seeds, or seedlings exceed expectations, the master controller may decrease the dosage of light, change the photon-emitting lighting wavelength, a duration of light, an amount of nutrients, an amount or frequency of water or other growing parameters. Moreover, these are only examples and any combination of adjustments to the grow recipe may be implemented.

Figure 7:
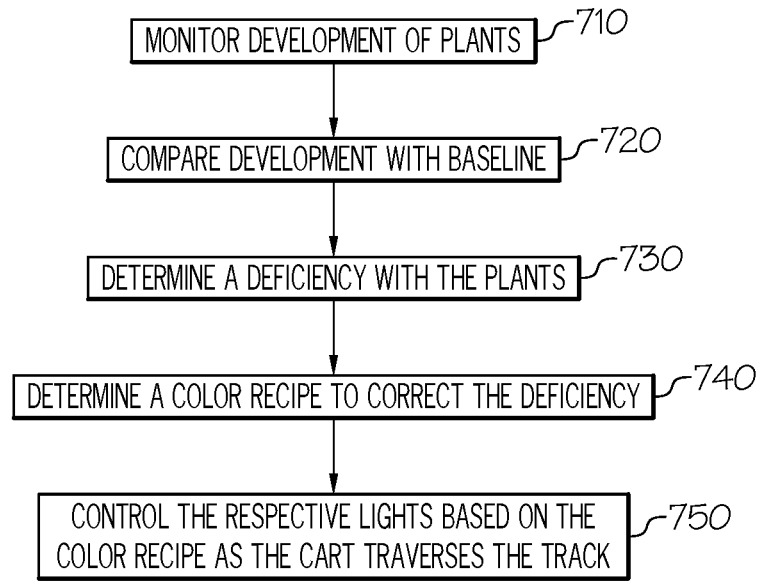
FIG. 7 depicts a flowchart of a method of determining a deficiency with the development of a plant and using light to correct the deficiency, according to one or more embodiments shown and described herein.

Referring now to FIG. 7, a flowchart of a method of determining a deficiency with the development of a plant and using light to correct the deficiency, according to one or more embodiments is depicted. In some embodiments, the logic of the master controller may be configured with the logic depicted in the flowchart 700. At block 710, the master controller may utilize one or more sensors including a camera to monitor the development of the plurality of plants, seeds, and/or seedlings growing within the cart. For example, the camera may capture images of the plurality of plants, seeds, and/or seedlings to determine the state of development. At block 720, the master controller may compare the state of development determined from the images of the plurality of plants, seeds, and/or seedlings to a baseline state of development. The baseline state of development may be a predefined measure of development for the plurality of plants, seeds, and/or seedlings growing within the cart.

At block 730, the comparison of the state of development of the plurality of plants, seeds, and/or seedlings to the baseline state of development may indicate a deficiency with some or all of the plurality of plants, seeds, and/or seedlings. For example, a plant color, plant size, the presence of or the lack of the presence of fruit, or the like may indicate that there is a deficiency with some or all of the plurality of plants, seeds, and/or seedlings. In response to a determination of a deficiency, a color recipe may be selected and/or modified to correct the deficiency, at block 740. The master controller, at block 750, may generate one or more control signals to control the respective lighting devices which are adjacent to the cart that includes the plants, seeds, and/or seedlings determined to have a deficiency. The master controller may continuously cause the light devices that are adjacent to the output light according to the color recipe. That is, as the cart traverses the track, the master controller controls the respective lighting devices that are adjacent to the cart as the cart moves.

It should be understood that the master controller may also implement other measures for correcting the deficiency of some or all of the plurality of plants, seeds, and/or seedlings. For example, the master controller may increase or decrease the amount of water, the amount of nutrients, or change the type of nutrients, the quality of air, or the pH of the water delivered to the plurality of plants, seeds, and/or seedlings.

Figure 8:
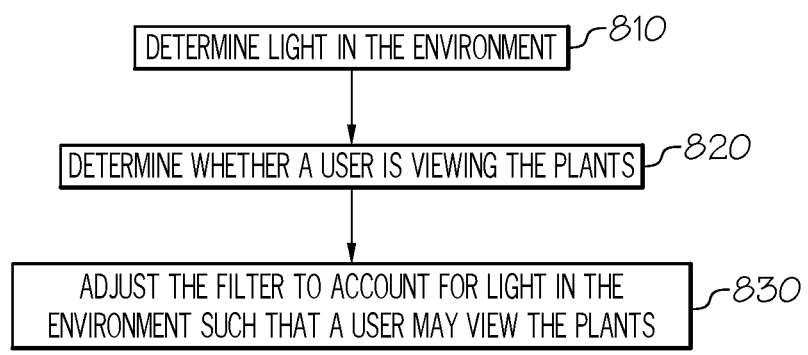
FIG. 8 depicts a flowchart of a method of adjusting the light in the environment of the assembly line grow pod so that a user may view the plants, according to one or more embodiments shown and described herein.

Referring now to FIG. 8, a flowchart of a method of adjusting the light in the environment of the assembly line grow pod so that a user may view the plants, according to one or more embodiments shown and described herein, is depicted. In some embodiments, the type of intensity, color, or type of light emitted by the lighting devices may impair a person's ability to view the plurality of plants, seeds, and/or seedlings growing in the assembly line grow pod. As such, the master controller may adjust one or more filters to allow a person to view the plurality of plants, seeds, and/or seedlings by implementing, for example, the following method. At block 810, the master controller may determine the light present in the environment. For example, the master controller may determine from the one or more instructions of the grow recipe the one or more photon-emitting light wavelengths output by the one or more lighting devices. The one or more instructions may define the intensity, wavelength, or the like for the one or more lighting devices. That is, the master controller may look up the one or more instructions relating to the one or more lighting devices in the plant logic and/or plant data to determine the intensity, wavelength, or the like for the one or more lighting devices. By way of another example, the image capture system may include a light sensor communicatively coupled to the master controller. The master controller may receive one or more signals from the light sensor corresponding to the intensity, wavelength, or the like of the light output by the one or more lighting devices for growing.

At block 820, one or more sensors may be implemented to determine whether a person is viewing the plants. For example, a viewing may be done in person in the grow pod or remotely via a computing device and a display. When viewing in person in the grow pod, the master controller may adjust the filter to decrease an intensity of the one or more photon-emitting light wavelengths output by the one or more lighting devices, at block 830. For example, the filter may be coupled to a lighting device to filter the one or more photon-emitting light wavelengths output by the one or more lighting devices. In some embodiments, a filter may be positioned between the person and the carts such that viewing of the carts may be accomplished through the filter. In yet other embodiments, the filter may be applied to a camera so that images captured by the camera and transmitted to a remote display are filtered. It should be understood that the filters may be adjusted so that a person may view the plants without impairment by the unique combination of one or more photon-emitting light wavelengths and/or their related intensity.

As illustrated above, various embodiments for providing an image capture system in an assembly line grow pod are disclosed. These embodiments provide a system with the ability to monitor and adjust the automation of plant growth with a grow pod. Additionally, these systems and methods provide the capability of adjusting for grow recipe conditions that may affect image captures such as the presence of colored light without interfering with the grow recipe conditions. For example, an automatically adjustable filter may be implemented with the camera to filter colored light present in the environment to allow the camera to capture images, which are not biased by the colored light in the environment. Furthermore, in response to the images captured, the master controller may automatically update one or more instructions within a grow recipe to improve or correct the growth of the plants, seeds, and or seedlings within the grow pod.

Accordingly, some embodiments may include an assembly line grow pod that includes one or more cameras for capturing images of the plants, seeds, or seedlings growing in the grow pod. The images may then be utilized to determine one or more attributes of the growing plants, seeds, and seedlings and the grow recipe for those plants, seeds, and seedlings may then be updated based on the one or more attributes determined from the images.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that the embodiments disclosed herein includes systems, methods, and non-transitory computer-readable mediums for providing an assembly line grow pod. It should also be understood that these embodiments are merely exemplary and are not intended to limit the scope of this disclosure.

What is claimed is:

1. An image capture system for a grow pod comprising:
 a master controller that includes a processor and a non-transitory computer readable memory; and
 one or more cameras communicatively coupled to the master controller and positioned to capture one or more images of a plurality of plants, seeds, or both;
 one or more lighting devices configured to output one or more photon-emitting light wavelengths;
 a light sensor that generates one or more signals indicating the one or more photon-emitting light wavelengths output by the one or more lighting devices, the light sensor is communicatively coupled to the master controller;
 a filter optically coupled to the one or more cameras and communicatively coupled to the master controller, wherein:
  the non-transitory computer readable memory stores a grow recipe and a logic,
  the grow recipe defines one or more instructions for growing the plurality of plants, seeds, or both and one or more expected attributes corresponding to the one or more instructions of the grow recipe, and
  the logic, when executed by the processor, causes the master controller to perform at least the following:
   receive, from the light sensor, the one or more signals indicating the one or more photon-emitting light wavelengths output by the one or more lighting devices,
   determine, from the one or more signals, the one or more photon-emitting light wavelengths output by the one or more lighting devices,
   automatically adjust the filter, optically coupled to the one or more cameras, to decrease an intensity of the one or more photon-emitting light wavelengths output by the one or more lighting devices thereby reducing bias in color, intensity, or wavelength in the one or more images captured by the one or more cameras through the filter optically coupled thereto;
   receive, from the one or more cameras, the one or more images of the plurality of plants, seeds, or both,
   determine one or more attributes of the plurality of plants, seeds, or both from the one or more images,
   compare the one or more attributes of the plurality of plants, seeds, or both from the one or more images to the one or more expected attributes defined by the grow recipe, and
   adjust the one or more instructions of the grow recipe for growing the plurality of plants, seeds, or both based on the comparison of the one or more attributes to the one or more expected attributes.

2. The image capture system of claim 1, wherein the determination of the one or more attributes of the plurality of plants, seeds, or both includes the determination that the plurality of plants, seeds, or both are ready for harvesting.

3. The image capture system of claim 1, wherein the master controller performs at least the following:
   determine, from the one or more instructions of the grow recipe, the one or more photon-emitting light wavelengths output by the one or more lighting devices, and
   adjust the filter to decrease an intensity of the one or more photon-emitting light wavelengths output by the one or more lighting devices.

4. The image capture system of claim 3, wherein the one or more lighting devices output the one or more photon-emitting light wavelengths at a first wavelength and the filter is adjusted to decrease the intensity of the one or more photon-emitting light wavelengths at the first wavelength.

5. The image capture system of claim 1, wherein the determination of the one or more attributes of the plurality of plants, seeds, or both includes the determination of a color of the plurality of plants, seeds, or both.

6. The image capture system of claim 1, wherein the one or more instructions of the grow recipe include at least one of the following: an intensity of light, a wavelength of light, a type of nutrient, an amount of nutrients, or an amount of water.

7. The image capture system of claim 1, wherein the one or more cameras couple to a track that supports a cart configured to move along the track and support the plurality of plants, seeds, or both.

8. A grow pod having an image capture system comprising:
   one or more lighting devices configured to output one or more photon-emitting light wavelengths,
   a master controller that includes a processor and a non-transitory computer readable memory;
   one or more cameras communicatively coupled to the master controller and positioned to capture one or more images of a plurality of plants, seeds, or both; and
   a filter coupled to the one or more cameras and communicatively coupled to the master controller, wherein
      the non-transitory computer readable memory stores a grow recipe and a logic,
      the grow recipe defines one or more instructions for operating the grow pod to grow the plurality of plants, seeds, or both,
      the logic, when executed by the processor, causes the master controller to perform at least the following:
         determine, from the grow recipe, the one or more photon-emitting light wavelengths output by the one or more lighting devices, and
         cause an automatic adjustment to the filter, optically coupled to the one or more cameras, to decrease an intensity of the one or more photon-emitting light wavelengths output by the one or more lighting devices thereby reducing bias in color, intensity, or wavelength in the one or more images captured by the one or more cameras through the filter optically coupled thereto.

9. The grow pod of claim 8, wherein the adjustment to the filter causes the filter to block the one or more photon-emitting light wavelengths output by the one or more lighting devices.

10. The grow pod of claim 8, wherein the filter comprises an electrochromic material having one or more color-switchable electrochemical cells.

11. The grow pod of claim 8, wherein:
   the grow recipe defines one or more expected attributes corresponding to the one or more instructions of the grow recipe, and wherein the master controller performs at least the following:
      receive, from the one or more cameras, the one or more images of the plurality of plants, seeds, or both,
      determine one or more attributes of the plurality of plants, seeds, or both from the one or more images,
      compare the one or more attributes of the plurality of plants, seeds, or both from the one or more images to the one or more expected attributes defined by the grow recipe, and
      adjust the one or more instructions of the grow recipe for growing the plurality of plants, seeds, or both based on the comparison of the one or more attributes to the one or more expected attributes.

12. The grow pod of claim 11, wherein the determination of the one or more attributes of the plurality of plants, seeds, or both includes the determination of a growth state of the plurality of plants, seeds, or both.

13. The grow pod of claim 11, wherein when the comparison of the one or more attributes of the plurality of plants, seeds, or both to the one or more expected attributes indicates the one or more attributes does not meet or exceed the one or more expected attributes, the one or more instructions of the grow recipe is adjusted to increase a dosage of at least one of the following: an intensity of light, a wavelength of light, a duration of light, an amount of nutrients, or an amount of water.

14. The grow pod of claim 11, wherein when the comparison of the one or more attributes of the plurality of plants, seeds, or both to the one or more expected attributes indicates the one or more attributes exceeds the one or more expected attributes, the one or more instructions of the grow recipe is adjusted to decrease a dosage of at least one of the following: an intensity of light, a wavelength of light, a duration of light, an amount of nutrients, or an amount of water.

15. A method of utilizing an image capture system in a grow pod, the method comprising:
   receiving a grow recipe including one or more instructions for growing a plurality of plants, seeds, or both and one or more expected attributes corresponding to the one or more instructions of the grow recipe;
   receiving, from a light sensor, one or more signals indicating one or more photon-emitting light wavelengths output by one or more lighting devices,
   determining, from the one or more signals, the one or more photon-emitting light wavelengths output by the one or more lighting devices;
   automatically adjusting a filter, optically coupled to a camera, to decrease an intensity of the one or more photon-emitting light wavelengths output by the one or more lighting devices thereby reducing bias in color, intensity, or wavelength in an image captured by the camera through the filter optically coupled thereto;
   capturing the image from the camera of the plurality of plants, seeds, or both supported in a cart configured to move along a track;
   determining one or more attributes of the plurality of plants, seeds, or both from the image,
   comparing the one or more attributes of the plurality of plants, seeds, or both from the image to the one or more expected attributes defined by the grow recipe; and
   adjusting the one or more instructions of the grow recipe for growing the plurality of plants, seeds, or both based on the comparison of the one or more attributes to the one or more expected attributes.

16. The method of claim 15, further comprising:
determining, from the grow recipe, the one or more photon-emitting light wavelengths output by the one or more lighting devices; and
automatically adjusting the filter coupled to the camera to decrease an intensity of the one or more photon-emitting light wavelengths output by the one or more lighting devices as determined from the grow recipe.

17. The method of claim 15, further comprising:
adjusting an output of a lighting device from one or more photon-emitting light wavelengths defined by the grow recipe to output of light including wavelengths of light spanning across a visible spectrum prior to and while capturing the image; and
adjusting the output of the lighting device from the output of light including wavelengths of light spanning across the visible spectrum to the one or more photon-emitting light wavelengths defined by the grow recipe after capturing the image.

18. The method of claim 15, wherein the one or more instructions of the grow recipe include at least one of the following: an intensity of light, a wavelength of light, a type of nutrient, an amount of nutrients, or an amount of water.

* * * * *